March 28, 1961  W. D. MACGEORGE  2,977,521
CONTROL CIRCUITS FOR REVERSIBLE ELECTRICAL
LOADS, INCORPORATING MAGNETICALLY
CONTROLLED GAS TUBES Filed Nov. 16, 1955

INVENTOR
William D. Macgeorge
BY
Frank H. Borden
ATTORNEY

United States Patent Office 2,977,521
Patented Mar. 28, 1961

2,977,521

CONTROL CIRCUITS FOR REVERSIBLE ELECTRICAL LOADS, INCORPORATING MAGNETICALLY CONTROLLED GAS TUBES

William D. Macgeorge, North Wales, Pa., assignor to Automatic Timing & Controls, Inc., a corporation of Pennsylvania Filed Nov. 16, 1955, Ser. No. 547,074

4 Claims. (Cl. 318—257)

This invention relates to control circuits for reversible electrical loads utilizing magnetic control of "Thyratron" tubes.

The gas tube of adequate size known as "Thyratron" has been found an excellent control for relatively large motors, in the sense that the speed of the motor is substantially proportional to the output of the tube. A difficulty in the electronic circuitry for controlling such tubes is that it is complex and expensive so that the costs of using a "Thyratron" as a motor controller are comparatively high. When used for controlling a reversible motor the complexity and expense are compounded.

It is among the objects of this invention to provide a simple, economical and highly efficient control for a D.C. motor using a "Thyratron" type of gas tube, in which the starting and the speed of running of the motor are controlled by small D.C. currents flowing in an electro-magnetic device operatively associated with the tube; to provide a system for controlling a reversible motor comprising a pair of gas tubes of the "Thyratron" type, the outputs of which to the reversible motor are respectively controlled by small D.C. currents flowing in electromagnetic devices associated with the respective tubes; to effect control of the starting and of the speed of running of a reversible motor by a pair of gas tubes each having an associated electromagnetic device, with means for selectively energizing the respective electromagnetic devices; to effect the last mentioned control by means of a device controlling the current flow reciprocally in the respective tubes; to utilize the phase of a phased signal for controlling the starting and running of a motor; and many other objects and advantages will become more apparent as the description proceeds.

In the accompanying drawing, forming part of this description:

In carrying out the invention the output of a gas tube is controlled functionally with the vector formed by the electrostatic force pulling electrons toward the plate, and magnetic force generally normal thereto, as the latter varies with fluctuations in the voltage on the electromagnet. It is operative with an organization having pole pieces of an electro-magnet straddling each tube, so that the transverse magnetic force varies in amplitude with variations in the energization of the electro-magnet. It is believed that in general the theory of operation is something like the following: With no bias on the grid, or with the bias neutralized, and with no voltage on the electromagnet, aided by having the grid positive, the electrons move from the cathode through the slots in the grid toward the plate. Between the grid and the plate ionization occurs and the tube conducts. As the voltage begins to be applied to the electromagnetic device the electron stream is deflected toward the generally cylindrical shield grid by the magnetic force. Those contacting same are simply returned to the cathode. The greater the amplitude of voltage on the electromagnet the greater the deflection of the electrons. This eventually becomes such deflection that ionization ceases. On the other hand, with decrease of the magnetic force, more and more electrons pass through the slots in the grid until at some point ionization begins again and the tube conducts. However, this is functional with the voltage, that is, it depends upon the point on the curve of the A.C. wave at which the ionization occurs. The tube output thus becomes a time function, if ionization occurs close to the peak of the sine wave, it is a fragment of the cycle time and is a small tube output. If ionization occurs close to the zero line of the sine wave it becomes a much larger proportion of the cycle time and a much larger tube output.

Figure 1:
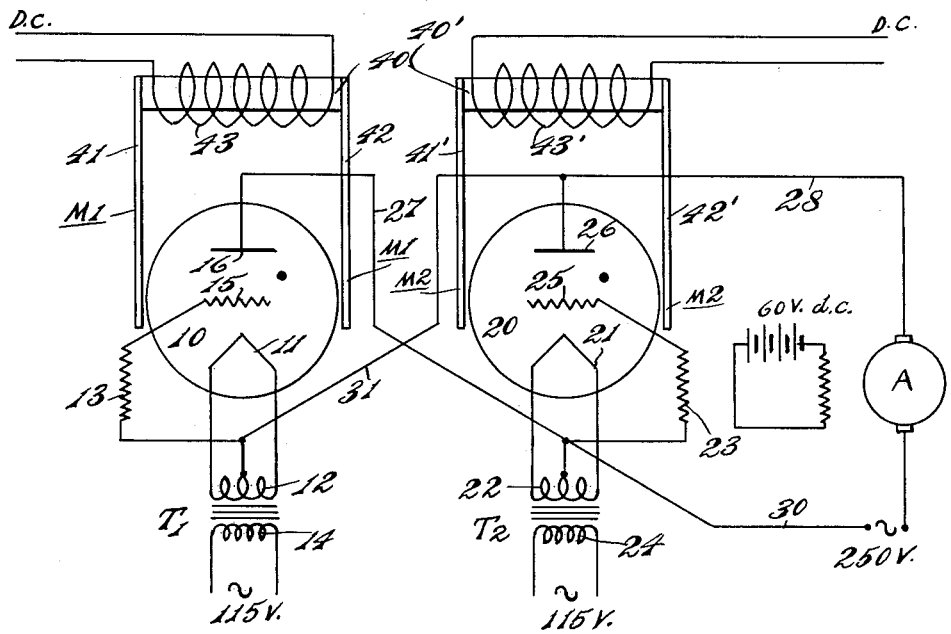
Fig. 1 represents a schematic diagram of the circuit controlling the running of a reversible motor representative of a load, utilizing variable magnetic effects on gas tubes for the control.

Referring to Fig. 1, a schematic motor-controlling circuit is disclosed, incorporating a pair of gas tubes, electromagnetic means for controlling the respective tube outputs, in operative association with a reversible D.C. motor, representative of a load.

The tube 10 is a gas tube, illustratively a "Thyratron C6J," for instance. The cathode 11 is supplied by the center-tapped secondary 12 of a transformer T1, the primary 14 of which is supplied by line voltage of illustratively 115 v. The grid 15 of tube 10 is connected through a resistance 13 to the center tap of the secondary 12. In the illustrative embodiment of the invention shown no bias is used on tube 10, or on tube 20, to be described. It will be understood however that bias may be used as explained in connection with Fig. 3.

The tube 20 is similar to tube 10, and the cathode 21 thereof is supplied by the center-tapped secondary 22 of a second transformer T2, the primary 24 of which is supplied by the same line voltage of the illustrative 115 v. The grid 25 of tube 20 is connected through resistance 23 to the center tap of the secondary 22.

The plate 16 of tube 10 is connected by line 27 with the center tap of secondary 22 of T2. The plate 26 of tube 20 is connected by line 31 to the center tap of the secondary 12 of T1.

An electrical load is provided, which for illustrative instance comprises a reversible shunt wound D.C. motor A. An illustrative D.C. voltage of an illustrative 60 v. is continuously supplied to the shunt winding of the motor from a suitable source, such as the battery shown, or its equivalent. This may have any desired amplitude other than 60 v. The armature of the motor A at one end is connected to the plate 26 of tube 20 by line 28, and at the other end to one side of a power supply, illustratively 250 v. A.C. Here again, this may have any desired amplitude. If desired the voltage on the shunt and the armature may be similar. The other side of the power supply connects through line 30 to the center tap of the secondary 22 of T2.

An electro-magnetic unit M1 is provided for tube 10, comprising a core 40, mounting generally parallel pole pieces 41 and 42 straddling tube 10. A deflection coil 43 is wound about the core 40 and is supplied by a variable D.C. current of the illustrative order of from 0 to .004 amp. The electro-magnetic unit M2 is similar to unit M1, and bears the same reference characters, primed, and straddles tube 20. The deflection coil 43' is supplied with D.C. current of the same low order of amplitude as is required for coil 43.

Figure 2:
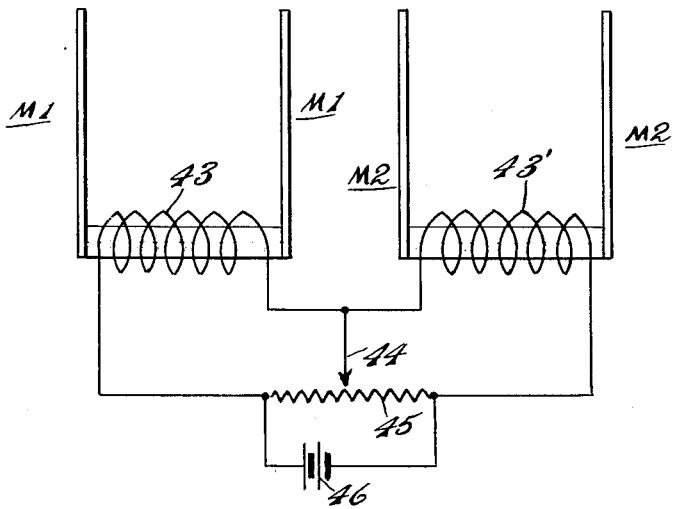
Fig. 2 represents a fragmentary diagram of a circuit for controlling electro-magnets of the circuit of Fig. 1, in an illustrative embodiment.

In Fig. 2 there is disclosed a diagram of an illustrative circuit for supplying the deflection coils 43 and 43'. Adjacent ends of the coils are connected together and to the movable arm 44 of a potentiometer 45 connecting the outer ends of the deflection coils 43 and 43'. A suitable source of current of low amperage, such as the battery shown, at 46, is connected to the outer ends of the deflection coils across the potentiometer 45.

With the arm 44 centered on the potentiometer wire 45 there are equal currents flowing in coils 43 and 43'. As the arm shifts on the potentiometer, say to the right in Fig. 2, the circuit is unbalanced and there is more current on coil 43 than on 43'. In this illustration it will be seen that the change of current on one coil is a reciprocal of the change of current on the other, and of course this is true in either direction of shift of the arm 44.

It will be understood that the arm 44 can be moved manually as desired, or it may be shifted automatically in response to movement of a working part, or in response to changes in the condition of an associated variable, as will be understood. Of course any other supply of variable current may be used for the supply of the deflection coils.

With any current on a deflection coil the core and the pole pieces are magnetically polarized, and the tube output in the given tube is controlled by the magnetic flux to which it is exposed. The flux magnitude and the degree of deflection of the electron stream increases as the strength of the current of the deflection coil increases. Conversely as the current strength diminishes the magnetic effects diminish, so that with 0 amp. on the deflection coil the tube conducts with maximum output. It will be understood that with the electromagnetic unit unenergized, there is a maximum power output from the instant tube, and this output decreases with magnetic flux increase, until at some point the power output ceases.

In operation according to the illustrative organization the arm 44 of the potentiometer 45 is centered, and current of the order of .002 amp. is supplied to both deflection coils 43 and 43'. The magnetic flux between the pairs of pole pieces 40 and 41, and 40' and 41' causes such cessation of ionization that there is no power output from either tube. At any such juncture the motor A is stationary. It is desired to run the motor A in one direction or the other according to the sense in which the relative current flows in coils 43 and 43' are reciprocally altered, and at speeds varying functionally with the degree of such reciprocal alteration.

Let it be assumed that with the motor stationary, the arm 44 moves or is moved on the potentiometer 45 so that the current flow through coil 43 decreases from the illustrative .002 amp., while that through coil 43' increases so that it is greater than the initial amperage. This decreased magnetic effect of unit M1, which follows, permits tube 10 to have less deflection and the tube conducts. The circuit is from the illustrative 250 v. power source, connector 30, connector 27, plate 16, cathode 11, connections 31 and 28 through the armature of motor A in one direction, and to the power source. With an opposite type of reciprocal alteration the deflection of tube 10 increases, keeping it from conducting, while permitting tube 20 to conduct. The circuit then is from the 250 v. power source the armature of the motor A connector 28, plate 26, cathode 21', conductor 30 to the power source.

Figure 3:
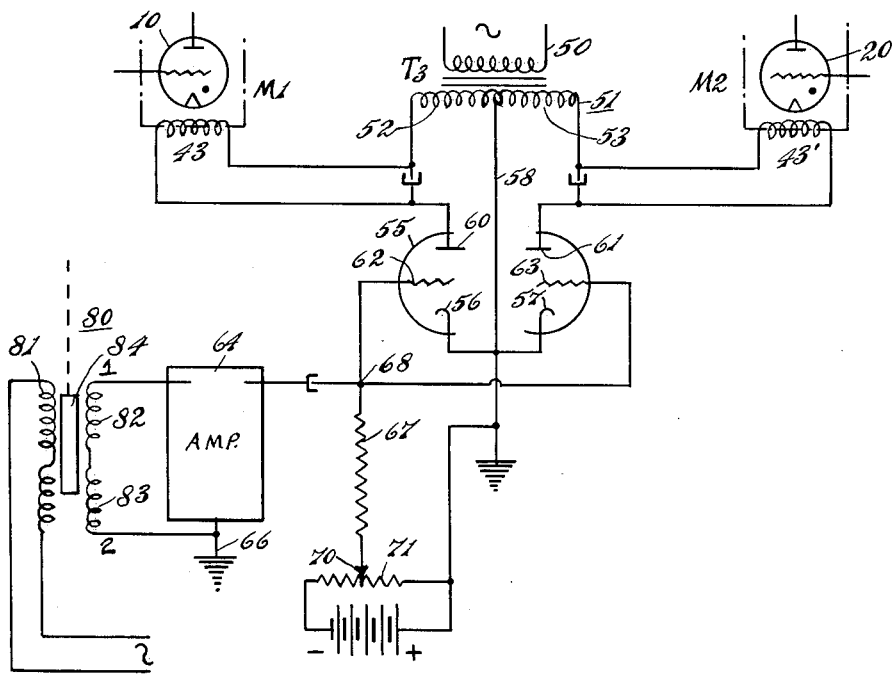
Fig. 3 represents an illustrative circuit for controlling a reversible motor by utilizing a phased signal for controlling the running of the motor, and in which, by the elimination of one half of the circuit, the running or stopping of a uni-directional motor can be controlled.

It will be seen that in the organizations described above, the control voltages incident on coils 43 and 43' have been controlled D.C. currents, and these illustratively have been controlled by movement of the slider arm of a potentiometer. It will be apparent that there are many signal devices having an A.C. output, varying from null in one direction for an A.C. output of given phase, and varying from null in the other direction for an A.C. output of the opposite phase. The phase relations are substantially 180° apart. It is desirable to use the phased signal for the control of the electromagnetic devices and thus of the instant gas tube for the control of an electrical load. An illustrative partially fragmentary circuit for this purpose is shown in Fig. 3. The connections from the illustrative tubes to the motor are omitted, but as they are similar to that of Fig. 1, the tubes and the electromagnetic coils only are disclosed.

Referring to Fig. 3, a power transformer T3 is provided, the primary 50 of which is supplied by line A.C. voltage, at the illustrative 115 v. The secondary 51 of the transformer T3 is center tapped and divides the secondary into two center-connected coils 52 and 53. Coil 52 is in series with deflection coil 43 of the tube 10, while coil 53 is in series with deflection coil 43' of tube 20.

A double triode tube 55 is provided, the respective cathodes 56—57 of which are connected to the center tap of the secondary coil 51 of T3 by a connector 58, leading to ground. Left hand plate 60 of the tube 55 is connected to the series circuit of deflection coil 43 and secondary 52. Right hand plate 61 is connected to the series circuit of deflection coil 43' and secondary coil 53. Suitable condensers are disposed across these circuits. The respective left hand grid 62 and right hand grid 63 are connected together, and across a condenser either directly to one lead of the phased signal device to be described, or, and preferably, to one output lead of an amplifier 64. The other amplifier output lead is by a conductor 66 to ground. While in many installations bias on the grids may preferably be omitted the introduction of suitable bias is a means of spacing the tube functionings through a desired amount of variation in the phase reversal signal. In a reversible motor actuation for instance with change of input signal from an existing signal the bias insures that the conduction of one tube and the motor running controlled thereby terminates completely and the motor becomes stationary, before, with reversal of the signal the other tube conducts and the motor runs oppositely. Bias is introduced into the system, illustratively, by a resistance 67 connected to the junction 68 of the grid leads. The resistance 67 is connected to the movable arm 70 of a potentiometer 71 connected at one end to the ground central tap connection 58, and at the other connected to one side of a D.C. source, such for purely illustrative instance as a battery shown, the other end of which connects to the ground connection 58. The D.C. source is across the potentiometer wire.

An input signal lead 1 is provided leading into the amplifier 64, if provided, or to the junction of the grids 68 if not, and a second input lead 2 joins connector 66 to ground. The phase reversal A.C. signal passing through the input leads 1 and 2 may be derived from any desired source. For instance it may arise from an A.C. powered bridge circuit having a leg of variable resistance, of any sort. The leg may comprise a strain gauge, a heat bulb or like variable resistance whereby with the bridge at null unbalance thereafter in one sense it furnishes an A.C. output of one phase, and unbalance of the bridge in the opposite sense furnishes an A.C. output of a reversed phase, i.e. substantially 180° from said given phase. For purposes of illustration the phase reversal signal will be considered to be a differential transformer. Preferably, but purely illustratively, the transformer used will be that shown in Macgeorge Patent No. 2,568,587.

As shown in Fig. 3 a differential transformer 80 is provided comprising a primary 81, two secondary coils 82 and 83, and a movable armature 84. The primary is energized by line voltage A.C., and the transformer is so organized that the output of the secondaries is bucking. The armature 84 is disposed for axial movement in response, for instance, to variations in the condition of an associated variable. The variable may be one that is directly or indirectly responsive to the running of the motor A, although it need not be. As is known of such differential transformers the ends of the secondaries connected to the respective leads 1 and 2, may impart a substantially null signal thereto when the armature is centered in the secondaries, from which it has an output of the given phase in one direction of relative armature motion, and an output of the reversed phase with departure of the armature in the other direction from its null output position. It will be seen therefor that the leads 1 and 2 may have a null signal, or a phased signal of one phase or its reversal according to the positioning of the armature. As is described in said patent the amplitude of the signal increases substantially linearly from null in either sense of signal development. When it is desired to hold the motor stationary, or to run it in either direction according to the phase of the signal, the armature is generally caused to move in both directions relative to its null setting. It will be clear however, that in a uni-directional motor, the control may be used to simply vary the speed of running of the motor by movements of the armature from null on one side only thereof. In this case one half of the organization shown may be omitted. For instance tube 20, coil 43', secondary coil 53, the right half of tube 55 can be omitted. In this case therefore the left half of the tube 55 only conducts or fails to conduct and tube 10 is the only gas tube in the system for running the motor in one direction or causing it to stop. In this partial circuit there may be bias on the tube if desired.

An illustrative use of such half system may be found for instance in a uni-directional drive for a tensioned web, in which the tension may vary for one reason or another. With the motor A driving the forward drum of the web driving system, the position of the armature 84 may be caused to fluctuate with variations in tension of such web sensed by a pivoted roller riding on the web. Variations in the tension as by slackness thereof actuates the control system in order to speed up the tensioning drum. Extra tautness of the web may cause the slowing down of the tensioning drum.

In operation as a phased signal control of the electromagnetic units of the dual tube type associated with a reversible electrical load it will be understood that the phase of the signal at points 1 and 2 is related to the phase of the plate voltage of the double triode tube 55. When the phased signal is of the sense that the grid 62 is instantaneously more positive than the cathode 56 the left side of the tube conducts. Simultaneously of course the phased signal on the grid 63 is made more negative and the right side of the tube 55 will not conduct. With a reversal of the phase of the signal at points 1 and 2 the left side grid 62 is made more negative and that side does not conduct, while the grid 63 is made more positive and the right side conducts.

In starting the operation with the organization shown in Fig. 3, there is no bias on either side of the tube 55 and both sides conduct. In starting, therefore, both coils 52 and 53 are fully energized by the respective sides of the tube 55 and the coils 43 and 43' are both equally energized and both electro-magnetic units M1 and M2 are equally energized to effect the same median deflection of the ion stream on both tubes 10 and 20, and with the outputs of the control tubes equal and mutually cancelling on the motor A, as in the median position of the arm 44 on potentiometer 45 of Fig. 2. Let it be assumed that this is the condition with equal and cancelling voltages at points 1 and 2 of Fig. 3. The motor is stationary.

With a change of condition of the variable resulting in axial motion of the armature or core 84 of the differential transformer, there is a differential transformer output of given phase and amplitude which is incident on both halves of the tube 55. Say the left hand half is energized to enhance its conductivity, which increases the voltage through coils 52 and 43 and consequently decreases the conductivity of the tube 10. Simultaneously the conductivity of the right hand side of tube 55 is decreased with consequent reduction in the voltage through coils 53 and 43', and an attendant decrease in the magnetic flux of M2, and tube 20 increases its conductivity and becomes dominant over the output of tube 10 and the motor A runs in one direction. The speed of running increases as the voltage across coils 53 and 43' decreases. Upon return of the transformer 80 to null output the voltage across coils 52 and 53 again becomes equal and the motor stops. With opposite phase output the situation will be reversed as will be clear.

The invention described is economical, rugged and highly efficient, and of extreme sensitivity, and permits the direct control of large electrical loads by microscopic currents.

I claim as my invention:

1. A control circuit for a reversible electrical load, and a power source comprising first connections for attachment across the power source and to one side of the reversible load and to the other side of said reversible load, a first gas tube, connections between the cathode and plate of said tube and said first connections to extend across such load in one direction, a second gas tube, connections between the cathode and plate of said second tube and said first connections to extend across such load in the other direction, a first electromagnetic unit producing a magnetic field within which said gas tube is located for controlling the tube output functionally with energization of the unit, a second electromagnetic unit producing a magnetic field within which said gas tube is located for controlling the second tube output functionally with energization of the second unit, each of said units comprising a metallic core juxtaposed to the respective gas tubes and metallic pole pieces mounted on the core and straddling the respective tubes, and a coil surrounding each core, and means for selectively energizing the respective units comprising an energized winding and means movable relative to the winding in response to variations in the condition of an associated variable and having a datum position in which the respective units are substantially equally energized from said winding and whereby movement of said means movable from such datum effects a differential energization of the respective units to cause the transmission of one of said gas tubes to effect actuation of said reversible load in a sense related to the sense of movement of said means movable from such datum.

2. A control circuit for a reversible electrical load, and a power source, comprising first connections for attachment across a power source and to one side of a reversible load, and to the other side of said reversible load, a first gas tube, connections between the cathode and plate of said tube and said first connections to extend across said load in one direction, a second gas tube, connections between the cathode and plate of said second tube and said first connections to extend across said load in the other direction, a first polarized electromagnetic unit associated with and producing a magnetic field within which said first tube is located for controlling the tube output functionally with energization of the unit, a second polarized electromagnetic unit associated with and producing a magnetic field within which said second tube is located for controlling the second tube output functionally with the energization of said second unit, each of said units comprising a metallic core juxtaposed to the respective gas tubes and metallic pole pieces mounted on the core and straddling the respective tubes, and a coil surrounding each core, and means for selectively energizing and deenergizing said respective first and second units substantially reciprocally, said means comprising connections between one end of each of the units and to a slider arm of a potentiometer, the other ends of said units being connected across the said potentiometer, and a current source connected to the respective units across said potentiometer.

3. A control circuit for controlling a motor from a stationary condition to running in one direction at varying speeds functional with variations in the condition of an associated variable, comprising a power gas tube, a motor controlled by the plate circuit of said tube, a core of magnetic material formed with pole pieces straddling said tube, a deflection coil operatively associated with the core and pole pieces to polarize same and establish a magnetic field operative on the electron stream of said tube to control its plate circuit and thus the running of said motor, a second tube including a cathode, anode and grid, means connected to a source of A.C. providing the anode circuit of said second tube and supplying said deflection coil, means responsive to variations in the condition of an associated variable for impressing a phased signal on the grid of said second tube related to the phase of the anode circuit thereof to control the conduction of said second tube and therefor the energization of said deflection coil functionally with the instantaneous condition of such variable.

4. In a control circuit for controlling a motor from a stationary condition to running in one direction or the other at various speeds functional with variations in the condition of an associated variable, a reversible motor, a first and a second power gas tube, said tubes operatively coupled to said motor to run the motor in one direction according to the dominance of the plate circuit output of one tube over that of the other and at a speed functional with the relative dominance, a core of magnetic material formed with pole pieces juxtaposed to and straddling each of the respective tubes, a deflection coil operatively associated with each core and its pole pieces to polarize same and establish a magnetic field operative on the electron stream of the tube which it straddles to control the plate circuit thereof, a third and a fourth tube each including a cathode, anode and grid, means connected to a source of A.C. providing the anode circuits of the third and fourth tubes and supplying the respective deflection coils, means responsive to variations in the condition of an associated variable for producing a substantially null signal or a phased signal of one phase or the opposite according to the instantaneous condition of such variable, means for impressing said signal on the grids of the third and fourth tubes, said means connected establishing that the anode circuit of the third tube is of one phase while that of the fourth tube is of opposite phase, said phased signal being related to the phase of the anode circuits of the third and fourth tubes and controlling the conductivity of the latter tubes to control the energization of the respective deflection coils and thereby control the running of said motor.

References Cited in the file of this patent

UNITED STATES PATENTS

| | | |
|---|---|---|
| 2,039,102 | McArthur | Apr. 28, 1936 |
| 2,206,008 | Spencer | June 25, 1940 |
| 2,437,140 | Waldie | Mar. 2, 1948 |
| 2,516,144 | Pawley | July 25, 1950 |
| 2,616,072 | Edwards et al. | Oct. 28, 1952 |
| 2,653,289 | Kelling | Sept. 22, 1953 |